United States Patent
Waissi et al.

(10) Patent No.: US 10,526,973 B2
(45) Date of Patent: Jan. 7, 2020

(54) SYSTEM FOR SUPPLYING A TURBINE ENGINE WITH FLUID HAVING A LOW PRESSURE PUMPING ASSEMBLY COMPRISING TWO PUMPS IN PARALLEL

(71) Applicant: SAFRAN AIRCRAFT ENGINES, Paris (FR)

(72) Inventors: Bellal Waissi, Vert Saint Denis (FR); Philippe Vertenoeuil, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 466 days.

(21) Appl. No.: 15/316,057

(22) PCT Filed: Jun. 3, 2015

(86) PCT No.: PCT/FR2015/051465
§ 371 (c)(1),
(2) Date: Dec. 2, 2016

(87) PCT Pub. No.: WO2015/185856
PCT Pub. Date: Dec. 10, 2015

(65) Prior Publication Data
US 2017/0101935 A1    Apr. 13, 2017

(30) Foreign Application Priority Data
Jun. 5, 2014 (FR) ..................... 14 55114

(51) Int. Cl.
*F02C 7/236*   (2006.01)
(52) U.S. Cl.
CPC .......... *F02C 7/236* (2013.01); *F05D 2240/40* (2013.01)
(58) Field of Classification Search
CPC ...... F02C 7/236; F05D 2240/40; F04D 13/14; F04D 15/0072
See application file for complete search history.

(56) References Cited

U.S. PATENT DOCUMENTS

| | | | |
|---|---|---|---|
| 2,506,611 A | * | 5/1950 | Alden ..................... F02C 7/228 417/216 |
| 2,782,595 A | * | 2/1957 | Pauly ..................... F02C 7/236 417/203 |

(Continued)

FOREIGN PATENT DOCUMENTS

| EP | 1 853 805 | 11/2007 |
|---|---|---|
| WO | WO 00/60239 A2 | 10/2000 |
| WO | WO 2006/087377 A1 | 8/2006 |

OTHER PUBLICATIONS

International Search Report dated Jul. 28, 2015, in PCT/FR2015/051465 filed Jun. 3, 2015.

(Continued)

*Primary Examiner* — Carlos A Rivera
(74) *Attorney, Agent, or Firm* — Oblon, McClelland, Maier & Neustadt, L.L.P.

(57) ABSTRACT

A system for supplying a turbine engine with fluid includes a first low-pressure pump, a downstream hydraulic resistance and a high-pressure volumetric pump located between the first low-pressure pump and the downstream hydraulic resistance. The downstream hydraulic resistance includes at least one element selected among a fluid proportioning unit, a filter, a flow meter, an exchanger, a cut-off valve and an injection system. The supply system includes a second low-pressure pump and a supply variator configured such as to vary the flow of fluid supplied to the second low-pressure pump, the second low-pressure pump and the supply variator being located parallel to the first low-pressure pump.

11 Claims, 3 Drawing Sheets

(56) References Cited

U.S. PATENT DOCUMENTS

| | | | | |
|---|---|---|---|---|
| 2,989,842 A * | 6/1961 | Neal | ............... | F02K 3/10 60/241 |
| 3,026,929 A * | 3/1962 | Burns | ............... | B64D 37/16 417/201 |
| 3,433,016 A * | 3/1969 | Borel | ............... | F02C 7/22 417/287 |
| 3,511,579 A * | 5/1970 | Gray | ............... | F04D 15/0072 417/25 |
| 3,614,269 A * | 10/1971 | Lanctot | ............... | F02C 7/236 417/233 |
| 3,696,612 A * | 10/1972 | Berman | ............... | F02C 7/26 60/39.281 |
| 3,699,774 A * | 10/1972 | Davis | ............... | F02C 9/30 417/426 |
| 5,118,258 A * | 6/1992 | Martin | ............... | F02C 7/236 417/3 |
| 6,250,894 B1 * | 6/2001 | Dyer | ............... | F02C 7/236 137/114 |
| 8,011,904 B2 * | 9/2011 | Maguire | ............... | B64D 13/02 417/427 |
| 9,347,335 B2 | 5/2016 | Laigle et al. | | |
| 2011/0139123 A1 | 6/2011 | Brocard et al. | | |

OTHER PUBLICATIONS

French Search Report dated Feb. 9, 2015, in French Application 1455114 Filed Jun. 5, 2014.

U.S. Appl. No. 14/750,121, filed Jun. 25, 2015, 2015/0377235 A1, Philippe Vertenoeuil.

U.S. Appl. No. 15/304,212, filed Oct. 14, 2016, Philippe Vertenoeuil et al.

U.S. Appl. No. 14/423,801, filed Feb. 25, 2015, 2015/0204246 A1, Jordane Peltier et al.

* cited by examiner

SYSTEM FOR SUPPLYING A TURBINE ENGINE WITH FLUID HAVING A LOW PRESSURE PUMPING ASSEMBLY COMPRISING TWO PUMPS IN PARALLEL

TECHNICAL FIELD

The invention relates to the general technical field of aircraft turbomachines such as turbojet engines and turboprop engines. More precisely, the invention belongs to the technical field of systems for supplying fluid, in particular lubricant or fuel, for a turbomachine.

BACKGROUND OF THE INVENTION

A turbomachine fuel supply system, according to a known design of the state of the art, comprises a low pressure pump configured to increase the pressure of the fuel which flows to a high pressure volumetric pump after passing through a hydraulic resistance. The low pressure pump is in particular a centrifugal pump.

The high pressure volumetric pump is for supplying fluid at a constant flow rate both to a supply circuit having variable geometries and a fuel supply circuit of a combustion chamber. The fuel supply circuit of the combustion chamber comprises a fuel metering system configured to control the fuel flow rate towards the injection systems of the combustion chamber. More precisely, the fuel metering system is for allowing excess fuel to flow through a recirculation loop configured to convey fuel upstream of the high pressure pump.

However, this excess fuel flowing in the fluid recirculation loop generates a significant heat energy dissipation. More generally, the heat power dissipated in the supply system is quite high. As a result, there is a decrease in the overall performances of a turbomachine comprising the supply system.

DISCLOSURE OF THE INVENTION

The invention aims at solving at least partially the problems encountered in solutions of prior art.

In this regard, one object of the invention is to provide a system for supplying a turbomachine with fluid, preferably fuel, comprising:

a low pressure pumping assembly comprising a primary branch including a first low pressure pump, a downstream hydraulic resistance comprising at least one element selected from a fluid metering system, a filter, a flow meter, an exchanger, a cut-off valve and an injection system, and a high pressure volumetric pump located between the low pressure pumping assembly and the downstream hydraulic resistance.

According to the invention, the low pressure pumping assembly comprises a secondary branch in parallel with the primary branch, the secondary branch comprising a second low pressure pump and a supply variator configured to vary the flow rate of fluid supplying the second low pressure pump.

The low pressure assembly enables a better compromise as regards energy efficiency, both during take-off and climb phases of flight, and cruise phases of the turbomachine, which a low pressure pumping assembly with a single centrifugal pump would not allow as significantly.

The supply variator is in particular configured to control supply of the second low pressure pump with fluid. More precisely, the supply variator is configured to vary the proportions of flow rate of fluid supplying the second low pressure pump with respect to those supplying the first low pressure pump. The supply variator is preferably able to limit the flow rate of fluid supplying the second low pressure pump.

The fluid in the supply system is in particular lubricant or fuel.

The invention can include optionally one or more of the following characteristics being combined or not.

Advantageously, the supply variator comprises an obturator movable between an opening end position in which the supply variator allows fluid to flow to the second low pressure pump, and a closing end position in which the supply variator prevents at least partly the second low pressure pump from being supplied with fluid, such that the opening of the obturator is automatically controlled, by an electrical control and/or hydraulically controlled by the pressure upstream of the low pressure pumping assembly.

According to a particular embodiment, the opening of the obturator is electrically or electro-mechanically controlled, so as to allow fluid to flow to the second low pressure pump when the rotation speed of the high pressure body of the turbomachine exceeds a variable threshold. Alternatively, the pressure threshold is likely to be fixed during the operation of the turbomachine and/or between flights.

According to an advantageous embodiment, the supply variator is bistable with an opening stable state in which the supply variator allows fluid to flow to the second low pressure pump, and a closing stable state in which the supply variator prevents at least partly the second low pressure pump from being supplied with fluid.

In an alternative configuration, the supply variator comprises at least one stable intermediate position between the closing state and the opening state, preferably a plurality of stable intermediate positions. The supply variator is thereby in particular configured to vary the flow rate supplying the second low pressure pump within a continuous range of flow rate values.

According to another particular embodiment, the supply variator is a valve comprising a non-return valve, a plug, a bushing or a spool.

According to another advantageous embodiment, the first low pressure pump and the second low pressure pump are centrifugal pumps the wheels of which are located head to foot. It is thus possible to simplify the integration of the low pressure pumps in the turbomachine, and to reduce the energy withdrawal carried out by these pumps to operate. Furthermore, the implementation of such a solution enables resulting axial strains on the pumping assembly to be balanced.

The first low pressure pump and the second low pressure pump are preferably identical. The advantage of this preferred configuration is to reduce handling and manufacturing costs. In this case in particular, the primary branch preferably comprises a resistive element downstream of the first low pressure pump, the hydraulic resistance of the resistive element being equal to that of the supply variator. Thus, the recirculation events between the primary loop and the secondary loop are limited.

Advantageously, the low pressure pump is a gear volumetric pump configured to be mechanically driven by a turbomachine transmission gearbox. The transmission gearbox preferably transmits a couple transmitted by a turbomachine high pressure shaft, to mechanically drive the high pressure volumetric pump. The high pressure volumetric pump is in particular mounted to an Accessory Gear Box (AGB). The high pressure volumetric pump then relates to a robust and proven technology, which requires restricted development and certification efforts.

When the high pressure pump is a gear volumetric pump, the downstream hydraulic resistance preferably comprises a fluid metering system and an injection system, the fluid metering system being configured to control the flow rate towards the injection system and/or towards a fluid recirculation loop configured to convey fluid upstream of the high pressure pump.

The fluid recirculation loop is in particular configured to convey fluid from the metering system up to a discharge node located between the low pressure pumping assembly and the high pressure pump. The discharge node for example connects the supply circuit of the injection system with the upstream circuit.

The discharge node is located as close to the inlet of the high pressure volumetric pump as possible, in order to limit the heat power dissipated in the fluid recirculation loop. However, the discharge node is generally located upstream of an upstream hydraulic resistance.

In this regard, the supply system preferably comprises an upstream hydraulic resistance located between the low pressure pumping assembly and the high pressure pump. The upstream hydraulic resistance comprises at least one element selected from an exchanger, a filter, a cut-off valve or a flow meter.

The invention also relates to a turbomachine comprising a supply system as defined above.

The turbomachine can comprise a differential reducer configured to rotatably drive at least one propeller, and for supplying the supply circuit as defined above with lubricant. In this case, the turbomachine is in particular a turbomachine with an assembly of "Open Rotor" contra-rotating propellers.

BRIEF DESCRIPTION OF THE DRAWINGS

The present invention will be better understood upon reading a description of exemplary embodiments, given by way of purely indicating and in no way limiting purposes, making reference to the appended drawings in which.

DETAILED DISCLOSURE OF PARTICULAR EMBODIMENTS

Figure 1:
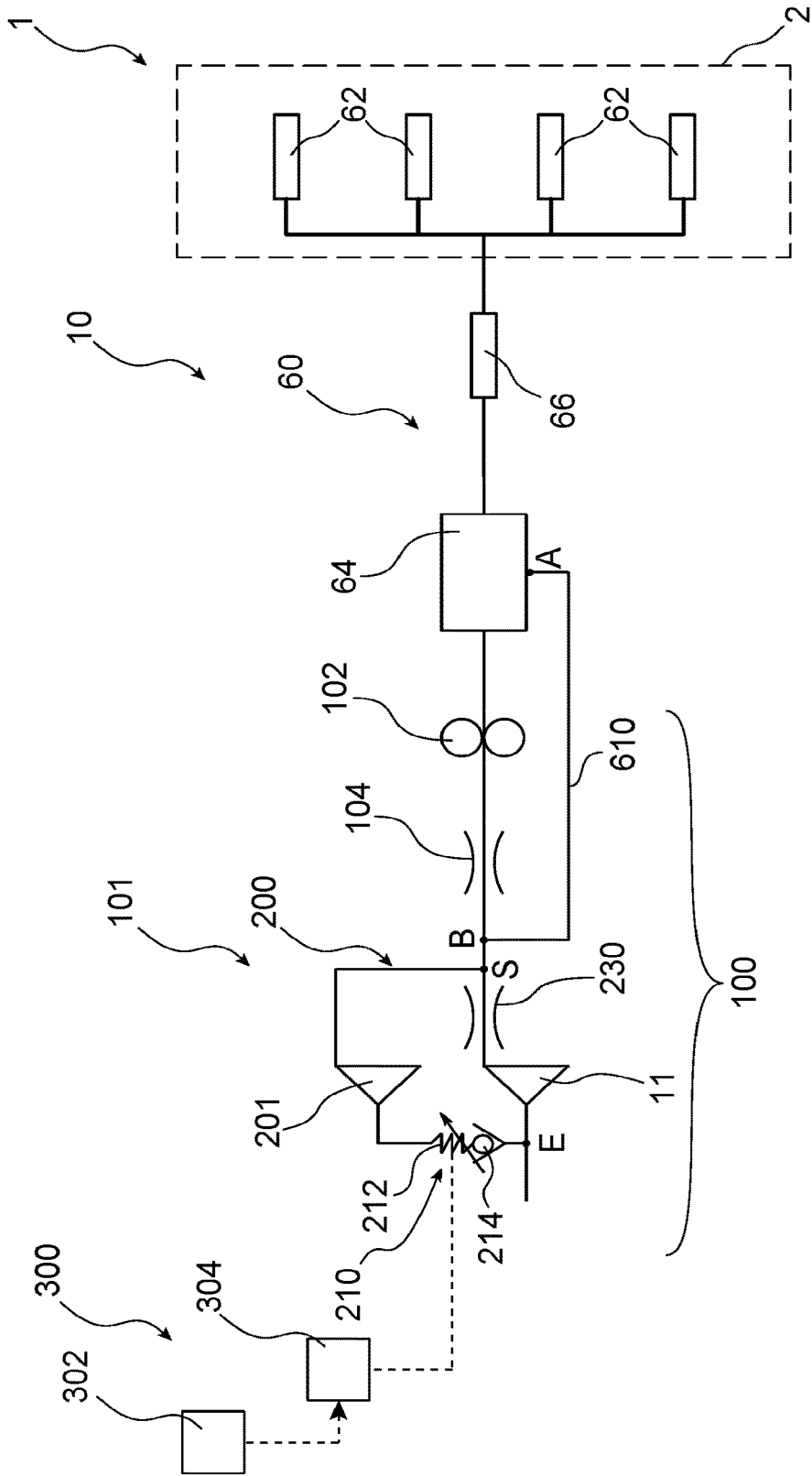
FIG. 1 is a partial schematic representation of a system for supplying a turbomachine with fluid, according to a first embodiment of the invention.

Identical, similar or equivalent parts of the different figures bear the same reference numerals so as to facilitate switching from one figure to the other.

FIG. 1 represents a system 10 for supplying an aircraft turbomachine 1 with fluid. In the described embodiment, the fluid is fuel. However, when the turbomachine 1 comprises a differential reducer (not represented) configured to rotatably drive at least one propeller, the fluid can also be a lubricant, typically oil.

The turbomachine 1 comprises a combustion chamber 2 and the fuel supply system 10 of the combustion chamber 2. The combustion chamber 2 comprises a plurality of fuel injectors and fuel injecting systems 62. The injection systems 62 cooperate with the injectors to supply the combustion chamber 2 with the fuel passing through the supply system 10.

The supply system 10 comprises an upstream circuit 100 and a downstream circuit 60 connected to the upstream circuit 100. The upstream circuit 100 is for controlling the flow rate and pressure of the fuel supplying the downstream circuit 60. The upstream circuit 100 is in particular used to increase the pressure of the fuel flowing towards the downstream circuit 60. The terms "upstream" and "downstream" are defined in reference to the general fuel flow direction in the supply system 10 towards the combustion chamber 2.

The upstream circuit 100 comprises a low pressure pumping assembly 101, a high pressure volumetric pump 102 and an upstream hydraulic resistance 104 located between the low pressure pumping assembly 101 and the high pressure pump 102. The term "hydraulic resistance" is used to define in this document, by analogy with the electricity field, the quantity from the ratio of the fluid pressure difference between the inlet and outlet of an element of the supply system to the flow rate of the fluid passing through the element. By metonymy and still by analogy with the electricity field, the term "hydraulic resistance" is also used to refer to an element of the supply system characterized by this quantity. The upstream hydraulic resistance 104 comprises for example an exchanger, a fuel filter, a cut-off valve and/or a flow meter.

The low pressure pumping assembly 101 is configured to increase the pressure of the fuel towards the high pressure pump 102, so as to limit/prevent cavitation risks inside the high pressure pump 102. The high pressure volumetric pump 102 is designed to supply the downstream circuit 60 with fuel at a constant flow rate. In the embodiment of the FIG. 1, the high pressure pump 102 is a gear volumetric pump configured to be mechanically driven by a turbomachine transmission box 1.

The constant fuel flow rate at the outlet of the gear volumetric pump 102 is higher than the flow rate necessary to feed the injection systems 62, regardless of the relevant phase of flight of the turbomachine 1. In particular, the constant flow rate provided by the high pressure volumetric pump 102 is determined depending on the necessary flow rates for the most restrictive running speeds of the turbomachine 1, that is the flow rates for the low speeds. The flow rate flowing in the supply system 10 is thus likely to be very important in conventional designs. As a result, there are heat powers dissipated by the supply system 10 and a decrease in the energy efficiency of the supply system 10.

Figure 2:
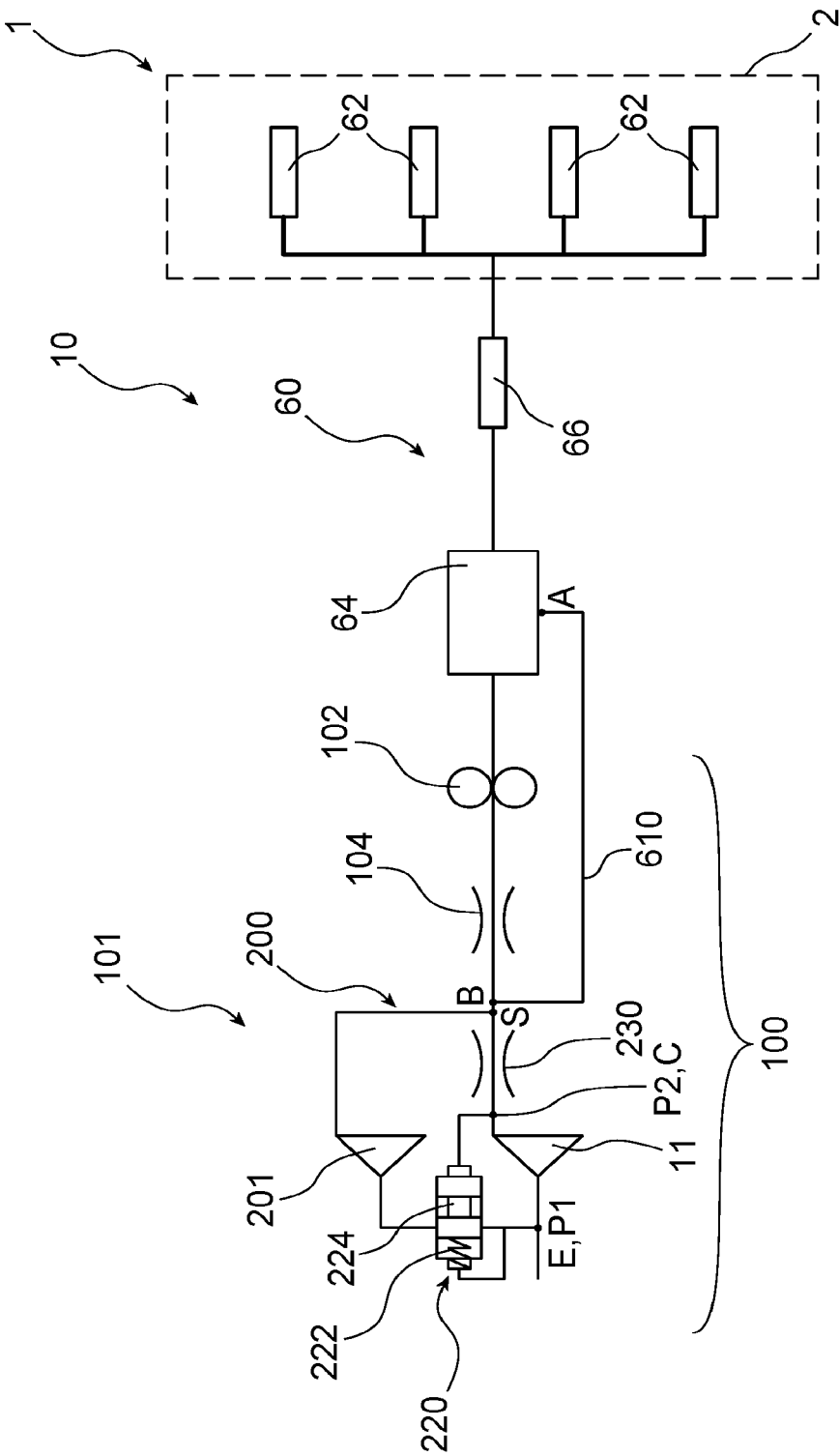
FIG. 2 is a partial schematic representation of a system for supplying a turbomachine with fluid, according to a second embodiment of the invention

The supply circuit 60 of the injection systems, being part of the downstream circuit 60, comprises a fuel metering system 64 configured to control the flow rate towards the injection systems 62. The fuel metering system 64 redirects the excess fuel into the supply circuit 60 of the injection systems 62 upstream of the high pressure pump 102 through a fuel recirculation loop 610. The fuel recirculation loop 610 is located between a first node A at the output of the fuel metering system 64 and a discharge node B located upstream of the high pressure pump 102. In the embodiment of FIG. 2, the discharge node B is located between the low pressure pumping assembly 101 and the upstream hydraulic resistance 104. The flow rate of fuel flowing in the recirculation loop 610 generates a significant part of the heat power dissipated in the supply system 10.

The supply circuit 60 of the injection systems further includes in a known manner a hydraulic resistance 66 downstream of the recirculation loop 610. This hydraulic resistance 66 comprises at least one element selected from a fuel filter, a flow meter, an exchanger and a high pressure cut-off valve. The fuel metering system 64, the hydraulic resistance 66 and the injection systems 62 form together a downstream hydraulic resistance 62, 64, 66.

In order to limit the heat losses in the supply system 10, and in particular in the recirculation loop 610, the low pressure pumping assembly 101 comprises a primary branch comprising a first low pressure pump 11, and a secondary branch 200 comprising a second low pressure pump 201. The secondary branch 200 further comprises a supply variator 210, 220 configured to vary the flow rate of fluid supplying the second low pressure pump 201. The supply variator 210, 220 is in particular configured to vary the proportions of fluid supplying the secondary branch 200 with respect to those supplying the primary branch.

The secondary branch 200 and the primary branch are in parallel. The primary branch and the secondary branch 200 connect to each other at an inlet node E and join at an outlet node S upstream of the high pressure pump 102. In the described embodiments, the discharge node B is located between the outlet node S and the upstream hydraulic resistance 104. As indicated above, the low pressure pumping assembly 101 is configured to increase the pressure of the fuel flowing from the inlet node E to the outlet node S.

The primary branch comprises a resistive element 230. The resistive element 230 is configured to make the hydraulic resistance of the primary branch and that of the secondary branch 220 equal, which enables fuel recirculation events to be limited in the low pressure pumping assembly 101, and in the supply system 10 generally. The resistive element 230 is for example in the form of a diaphragm.

Figure 3:
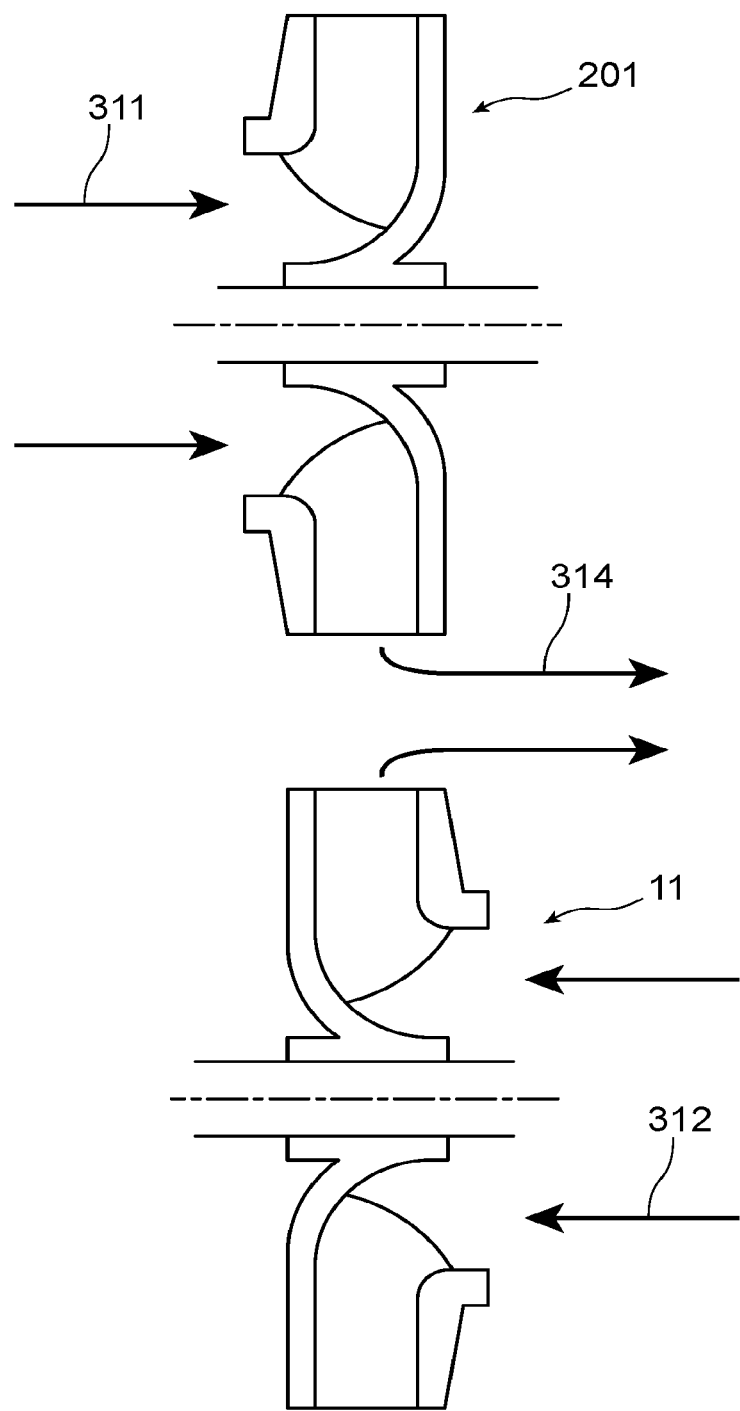
FIG. 3 is a partial cross-section schematic representation of the first low pressure pump and of the second low pressure pump, being located head to foot.

The first low pressure pump 11 and the second low pressure pump 201 are centrifugal pumps the wheels of which are preferably located head to foot, so as to reduce the bulkiness of the turbomachine 1 and to facilitate the integration of the low pressure assembly 101 in the turbomachine 1. The wheels of the first low pressure pump 11 and that of the second low pressure pump 201, represented in reference to FIG. 3, are thereby located facing each other, being preferentially coaxial or located about a same axis. The fluid flows in the direction of the arrow 301 to the arrow 304 in the second low pressure pump 201 on the one hand, and from the arrow 302 to the arrow 304 in the first low pressure pump 11 on the other hand. Another significant advantage of this configuration is to balance at least partly axial strains generated by the dynamic stresses of the fluid on the impeller. The first low pressure pump 11 and the second low pressure pump 201 are preferably identical, in particular for reasons of economy of scale and maintenance costs. In this case, the hydraulic resistance of the resistive element 230 is equal to that of the flow rate limiting means 210, 220.

The supply variator 210, 220 is located in the secondary branch 220 in series with the second low pressure pump 201, by being upstream of the second low pressure pump 201.

Alternatively, the supply variator 210, 220 can also be in series with the second low pressure pump 201, by being downstream of this pump. In the latter case, the head losses at the input of the second low pressure pump 201 are lower than when the supply variator 210, 220 is upstream of the second low pressure pump 201. Cavitation risks inside the second low pressure pump 201 are likely to be reduced.

Generally, the supply variator 210, 220 comprises an obturator 214, 224 movable between an opening end position and a closing end position. In this configuration, the supply variator 210, 220 is able to limit the flow rate of fluid supplying the second low pressure pump 201. In the opening end position, the supply variator 210, 220 allows fluid to flow to the second low pressure pump 201. At the closing end position, the supply variator 210, 220 either fully prevents the second low pressure pump 201 from being supplied with fuel, or allows a leakage flow rate having a predetermined value to flow, so as to cool the second low pressure pump 201. In the latter case, the obturator 214, 224 abuts at the closing end position, while allowing a sufficient port for the leakage flow rate to flow in the secondary branch 200. The opening and closing of the obturator 214, 224 are automatically controlled. The supply variator 210, 220 is preferably a bistable actuator with an opening stable state in which the obturator 214, 224 is in the opening end position, and a closing stable state in which the obturator 214, 224 is in the closing end position. In other words, the supply variator 210, 220 is an "on/off" type actuator.

In reference more specifically to FIG. 1, the supply variator 210 is a valve 210 comprising a non-return valve 214. The opening and closing of the obturator 214 as a non-return valve are controlled by an electrical control device 300, so as to counteract the spring force of a spring 212 configured to bring the obturator 212 back to the closing end position, in the absence of any control exerted on the supply variator 210. The opening and closing of the obturator 214 are directly or indirectly electrically controlled, so as to allow fluid to flow to the second low pressure pump 201 when the fuel pressure at the inlet node E of the low pressure pumping assembly 101 exceeds a variable threshold. The variable threshold is for example determined depending on the rotation speed of a high pressure body of the turbomachine 1 by a digital control system (not represented), also known as "FADEC (Full Authority Digital Engine Control)". The variable threshold is likely to vary during the operation of the turbomachine 1 or during flights of the turbomachine 1. More specifically, the control member 300 comprises an electronic control unit 302, also known as ECU. The electronic control unit 302 controls the opening and closing of the supply variator 210, through a servo-valve 304 or a solenoid valve 304, depending on the variable threshold.

The supply system 10 of FIG. 2 is different from the one of FIG. 1 in that the supply variator 220 is a valve 220 having a spool 224. The spool 224 plays the role of an obturator configured to slide between the opening end position and the closing end position, depending on the pressure difference across the low pressure pump 11 between the pressure P1 at the inlet node E and the pressure P2 at a control node C.

The spool 224 is mechanically connected to a return spring 222 configured to force the obturator 224 to be in the closing end position when the pressure P2 is lower than an opening threshold. In other words, the supply variator 220 is hydraulically controlled by the pressure difference between the inlet and outlet of the pump 11. The opening threshold of the supply variator 220 is thereby fixed. It is in particular determined depending on the characteristics of the spool 224 and the stiffness of the spring 222. In particular, it is possible to mechanically adjust the opening threshold of the supply variator 210, 220 by carefully selecting the stiffness of the spring 212, 222.

Generally, the low pressure pumping assembly 101 enables the energy efficiency of the supply system 10 to be improved by controlling the supply of the secondary branch 220, through the supply variator 210, 220, depending on the pressure differential across the low pressure pumping assembly 101. This pressure differential reflects the rotation speed of the high pressure body of the engine and thus the engine cycle point considered. The low pressure pumping assembly 101 is configured so as to achieve a satisfactory energy efficiency, both between take-off and climb phases of flight and in cruise phases of the turbomachine 1, which a low pressure pumping assembly with a conventional structure having a single centrifugal pump would not significantly allow.

Of course, various modifications can be provided by those skilled in the art to the invention just described without departing from the scope of the disclosure of the invention.

The invention claimed is:

1. A system for supplying a turbomachine with fluid, comprising:
   a low pressure pumping assembly comprising a primary branch including a first low pressure pump,
   a downstream hydraulic resistance comprising at least one element selected from a fluid metering system, a filter, a flow meter, an exchanger, a cut-off valve and an injection system, and
   a high pressure volumetric pump located between the low pressure pumping assembly and the downstream hydraulic resistance,
   wherein the low pressure pumping assembly comprises a secondary branch in parallel with the primary branch, the secondary branch comprising a second low pressure pump and a supply variator configured to vary a flow rate of fluid supplying the second low pressure pump,
   and wherein the secondary branch branches from the primary branch at a location upstream of said first low pressure pump, and rejoins the primary branch at a location upstream of said high pressure volumetric pump.

2. The supply system according to claim 1, wherein the system is configured to supply fuel.

3. The supply system according to claim 1, wherein the supply variator comprises an obturator movable between an opening end position in which the supply variator allows fluid to flow to the second low pressure pump, and a closing end position in which the supply variator prevents at least partly the second low pressure pump from being supplied with fluid,
   wherein an opening of the obturator is automatically controlled by at least one of electrical control and hydraulic control by a pressure upstream of the low pressure pumping assembly.

4. The supply system according to claim 3, wherein an opening of the obturator is electrically or electro-mechanically controlled so as to allow fluid to flow to the second low pressure pump when a rotation speed of a high pressure body of a turbomachine exceeds a variable threshold.

5. The supply system according to claim 1, wherein the supply variator is bistable with an opening stable state in which the supply variator allows fluid to flow to the second low pressure pump, and a closing stable state in which the supply variator prevents at least partly the second low pressure pump from being supplied with fluid.

6. The supply system according to claim 5, wherein the supply variator is a valve comprising a non-return valve, a plug, a bushing or a spool.

7. The supply system according to claim 1, wherein the first low pressure pump and the second low pressure pump are centrifugal pumps, the wheels of which are located head to foot.

8. The supply system according to claim 1, wherein the first low pressure pump and the second low pressure pump are identical.

9. The supply system according to claim 1, wherein the primary branch comprises a resistive element downstream of the first low pressure pump, the hydraulic resistance of the resistive element being equal to that of the supply variator.

10. The supply system according to claim 1, wherein the downstream hydraulic resistance comprises a fluid metering system and an injection system, the fluid metering system being configured to control a flow rate towards the injection system and/or towards a fluid recirculation loop configured to convey fluid upstream of the high pressure pump.

11. A turbomachine comprising a fluid supply system according to claim 1.

* * * * *